US010749799B2

(12) United States Patent
Jain et al.

(10) Patent No.: US 10,749,799 B2
(45) Date of Patent: Aug. 18, 2020

(54) DATA ROUTING OF EXTRANET FLOWS IN FABRIC NETWORKS

(71) Applicant: Cisco Technology, Inc., San Jose, CA (US)

(72) Inventors: Prakash Chand Jain, Fremont, CA (US); Sanjay Kumar Hooda, Pleasanton, CA (US); Victor M. Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 50 days.

(21) Appl. No.: 15/968,205

(22) Filed: May 1, 2018

(65) Prior Publication Data
US 2019/0342215 A1    Nov. 7, 2019

(51) Int. Cl.
*H04L 12/28* (2006.01)
*H04L 12/747* (2013.01)
*H04L 29/12* (2006.01)

(52) U.S. Cl.
CPC ........ *H04L 45/742* (2013.01); *H04L 61/2592* (2013.01); *H04L 2212/00* (2013.01)

(58) Field of Classification Search
USPC ....... 370/229, 230, 236, 252, 328, 349, 389, 370/392, 393, 395.3, 474, 475
See application file for complete search history.

(56) References Cited

U.S. PATENT DOCUMENTS

| 2011/0096782 | A1* | 4/2011 | Park | H04L 29/12367 370/392 |
| 2015/0003455 | A1* | 1/2015 | Haddad | H04L 45/38 370/392 |
| 2015/0263864 | A1* | 9/2015 | Yang | H04L 12/185 370/390 |
| 2016/0065531 | A1* | 3/2016 | Xiaopu | H04L 61/103 709/238 |
| 2017/0302743 | A1* | 10/2017 | Lin | H04L 45/02 |
| 2018/0367328 | A1* | 12/2018 | Hooda | H04L 61/103 |
| 2019/0081890 | A1* | 3/2019 | Ravindran | H04L 45/3065 |

* cited by examiner

*Primary Examiner* — Nguyen H Ngo
(74) *Attorney, Agent, or Firm* — Merchant & Gould P.C.

(57) ABSTRACT

In accordance with various embodiments, a method is performed including receiving, at a first node associated with a first instance identifier, a packet from a first host addressed to a second host. The method includes sending, from the first node to the second node, the packet. The method includes receiving, from the second node, a solicit map-request for the second host including the first instance identifier of the first node and the second instance identifier of the second node for the second host. The method includes sending, in response to receiving the solicit map-request for the second host, a map-request for the second host. The method includes receiving, in response to sending the map-request for the second host, a map-reply indicating a third node associated with the second instance identifier. The method includes sending, from the first node to the third node, the packet.

16 Claims, 9 Drawing Sheets

DATA ROUTING OF EXTRANET FLOWS IN FABRIC NETWORKS

TECHNICAL FIELD

The present disclosure generally relates to data routing of extranet flows in fabric networks and, in particular, to data routing to enabling time-sensitive voice and video shared services support across virtual networks transmitted over fabric networks.

BACKGROUND

Enterprise fabric networks are involving an increasing number of endpoint devices across different types of user groups. Accordingly, there is an increase in network traffic. Updating a map-cache while facilitating identification of a targeted flow quickly poses a challenge, especially when endpoint devices traverse virtual networks. A particular traffic flow (which may include voice and/or video) may not be updated in time to continue a service without interruption while the endpoint device traverses from one node in a network to another. These challenges are especially compounded in fabric architectures with the scale of external networks.

BRIEF DESCRIPTION OF THE DRAWINGS

For a better understanding of aspects of the various embodiments described herein and to show more clearly how they may be carried into effect, reference is made, by way of example only, to the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Various embodiments disclosed herein include devices, systems, and methods for sending and receiving a packet in a fabric network. For example, in some embodiments, a method is performed at a first node. The method includes receiving, at the first node associated with a first instance identifier, a packet from a first host addressed to a second host. The method includes sending, from the first node to the second node, the packet from the first host addressed to the second host. The method includes receiving, from the second node, a solicit map-request for the second host, the solicit map-request including the first instance identifier of the first node and the second instance identifier of the second node. The method includes sending, in response to receiving the solicit map-request for the second host, a map-request for the second host. The method includes receiving, in response to sending the map-request for the second host, a map-reply indicating a third node associated with the second instance identifier. The method includes sending, from the first node to the third node, the packet from the first host addressed to the second host.

In some embodiments, a method is performed at a second node. The method includes receiving, from a first node associated with a first instance identifier at a second node associated with a second instance identifier, a packet from a first host addressed to a second host. The method includes determining that the second host is not associated with the second node. The method includes sending a solicit map-request for the second host to the first node, the solicit map-request including the first instance identifier of the first node and the second instance identifier of the second node.

In accordance with some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

Example Embodiments

As endpoint devices (or hosts) in the fabric network traverse virtual networks, map-caches are updated. Accessing time-sensitive shared services with voice and video traffic within a Locator ID Separation Protocol (LISP)-based enterprise fabric across external networks in a time-efficient manner becomes an important objective. Additionally, in various implementations, a time-sensitive shared service uses an external network which has many subscribers for one provider. Instead of updating the map-caches and generating a new map-request every time a subscriber (or endpoint device) traverses the virtual networks, in some embodiments, generating solicit map-requests and facilitating identification of targeted traffic allows for quicker updates to the map-caches. Further, in generating the solicit map-requests, the solicit map-requests include identification information of the targeted traffic so that additional look-ups are not needed to process the solicit-map request, therefore speeding up the process.

Figure 1A:
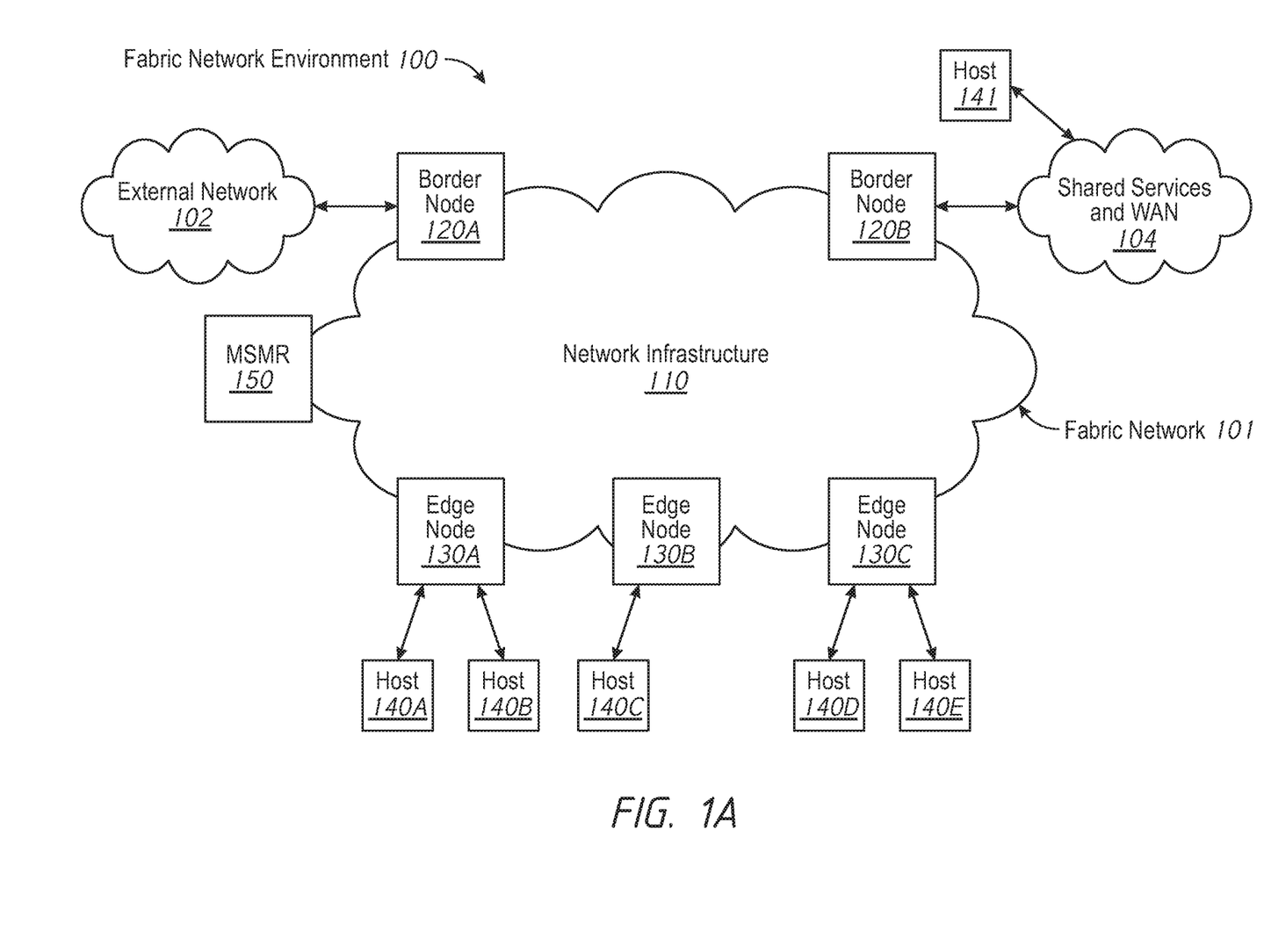
FIG. 1A is a block diagram of a fabric network environment in accordance with some embodiments.

FIG. 1A illustrates a fabric network environment 100 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the fabric network environment 100 includes a fabric network 101 coupled to one or more external networks 102, one or more shared services and wide access networks (WANs) 104, and one or more hosts 140A-140E. The fabric network 101 includes one or more border nodes 120A-120B coupled to the one or more external networks 102 and the one or more shared services and WANs 104. Although FIG. 1 illustrates only a single external network 102 corresponding to a single border node 120A, it is to be appreciated that, in some embodiments, the fabric network 101 includes multiple border nodes coupled to multiple external networks. Further, in various implementations, the shared services and WANs 104 themselves include one or more external networks.

In some embodiments, the border node 120A connects the fabric network 101 to traditional Layer-3 networks or other fabric networks (which could be of the same or different type). In some embodiments, the one or more external networks 102 include the internet, a public cloud, or a private cloud (such as a data center cloud or a virtual private cloud). Accordingly, in some embodiments, the border node 120A admits, encapsulates/decapsulates, and forwards traffic to and from the external network 102 connected to the border node 120A. In some embodiments, the border node 120A includes a border pair (e.g., a pair of servers or routers acting as a single unit). The border pair can include, for example, a router device that routes traffic to and from the border node 120A and a control plane device that performs control plane functionality.

In some embodiments, the border node 120B connects the fabric network 101 to the shared services and WANs 104, which includes an application policy infrastructure controller-enterprise module (APIC-EM), a dynamic host configuration protocol (DHCP)/domain name system (DNS), identity services, a WAN branch, a datacenter WAN, and/or the like. The shared services and WANs 104 are coupled to one or more external hosts (of which a first external host 141 is illustrated in FIG. 1A.

The fabric network 101 further includes a plurality of edge nodes 130A-130C coupled to the one or more hosts 140A-140E. In some embodiments, the one or more hosts 140A-140E includes a Layer-2 network, a wireless access point, or an endpoint device connected to a respective edge node 130A-130C. For example, the endpoint device can include a user device, such as a computer, a tablet, a smartphone.

In some embodiments, the plurality of edge nodes 130A-130C admit, encapsulate/decapsulate, and forward traffic to and from the hosts 140A-140E connected to the plurality of edge nodes 130A-130C. Although the hosts 140A-140E of FIG. 1A are illustrated as directly attached to respective edge nodes 130A-130C, it is to be appreciated that, in some embodiments, one or more of the hosts 140A-140E are coupled to their respective edge nodes 130A-130C via an intermediate Layer-2 network that lies outside the fabric network 101.

In the fabric network environment 100 of FIG. 1A, the fabric network 101 includes a first edge node 130A coupled to a first host 140A and a second host 140B. The fabric network 101 includes a second edge node 130B coupled to a third host 140C. The fabric network 101 includes a third edge node 130C coupled to a fourth host 140D and a fifth host 140E.

The fabric network 101 further includes a network infrastructure 110 including one or more interconnected intermediate nodes (e.g., switches or routers) that couple the border nodes 120A-120B to the edge nodes 130A-130C (and the edge nodes 130A-130C to each other). In some embodiments, the interconnected intermediate nodes provide the Layer-3 underlay transport service to fabric traffic. Thus, the interconnected intermediate nodes are Layer-3 forwarders that interconnect the edge nodes 130A-130C and the border nodes 120A-120B. In some embodiments, the intermediate nodes may be capable of inspecting the fabric metadata and could apply policies based on the fabric metadata. However, in some embodiments, all policy enforcement is performed by the edge nodes 130A-130C and the border nodes 120A-120B.

Accordingly, in some embodiments, the fabric network 101 implements a network topology where data traffic is passed through interconnecting switches, while providing the abstraction of a single Layer-2 and/or Layer-3 device. In some embodiments, the fabric network 101 uses IPoverlay, which makes the fabric network 101 appear like a single virtual router/switch without the use of clustering technologies. In some embodiments, the fabric network 101 provides seamless connectivity, independent of physical topology, with policy application and enforcement at the edges of the fabric (e.g., at the edge nodes 130A-130C and/or the border nodes 120A-120B).

Each of the border nodes 120A-120B and the edge nodes 130A-130C may be referred to as tunnel routers (xTR) or, in particular, to an ingress tunnel router (ITR) when receiving a packet destined for a host coupled to the node and/or an egress tunnel router (ETR) when transmitting a packet to an ITR. In various implementations, each of the hosts 140A-140E and the external host 141 are associated with a unique EID (endpoint identifier). Further, in various implementations, each of the tunnel routers are associated with one or more IIDs (instance identifiers). Each IID represents a different virtual network or virtual routing function (VRF) to which various hosts 140A-140E and 141 may also be associated.

As an example, in FIG. 1A, the first border node 120A is associated with a first IID and the second border node 120B is also associated with the first IID. The first edge node 130A is associated with the first IID and a second IID, the second edge node 130B is associated with the second IID, and the third edge node 130C is associated with a third IID. The external host 141 is in communication with the first host 140A via the shared services and WAN 104. When a packet from the external host 141 is received by the second border node 120B, it is encapsulated and routed to the first edge node 130A which decapulates the packet and forwards it to the first host 140A. However, at some point in time, the first host 140A may move and associated with the second edge node 130B.

Figure 1B:
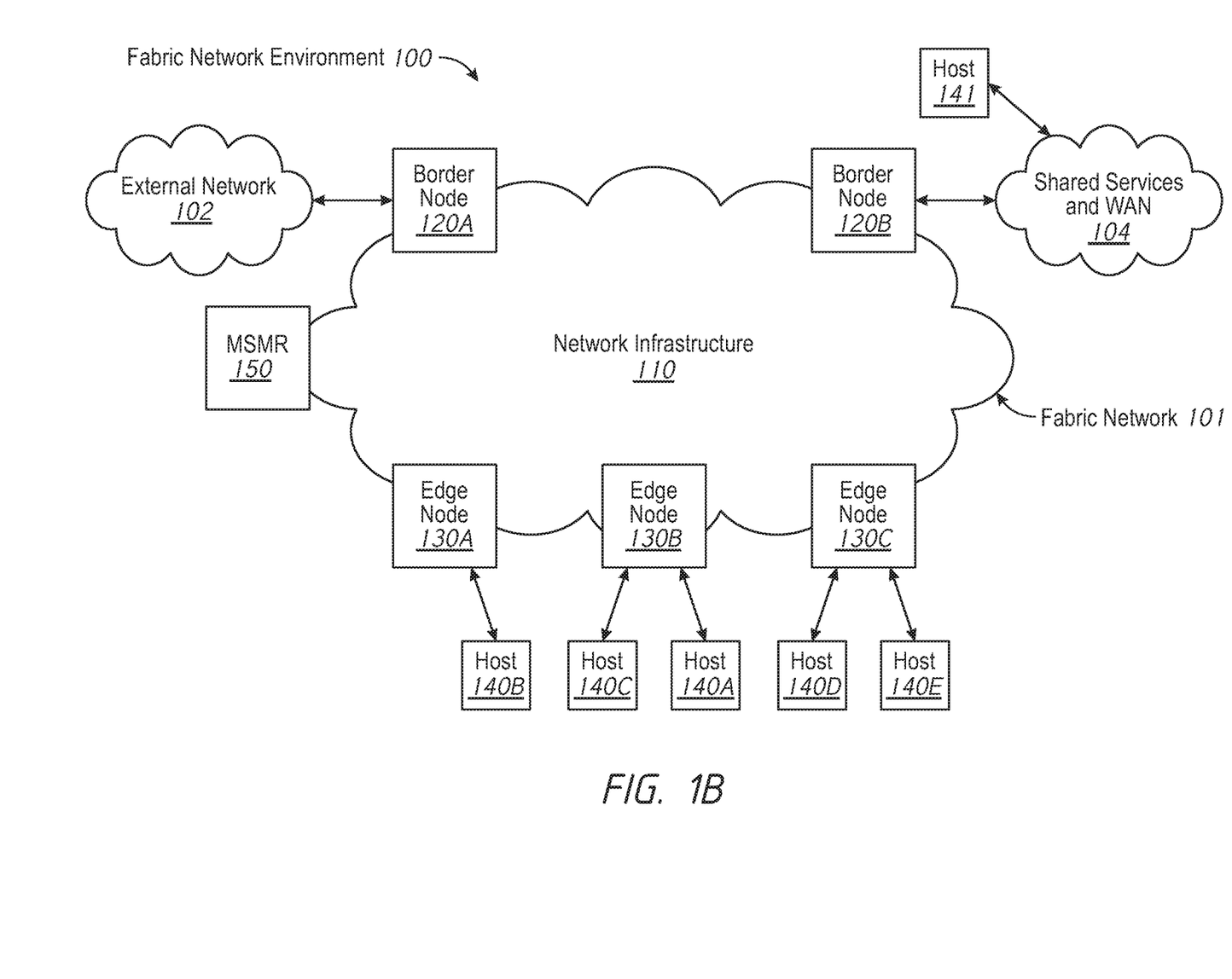
FIG. 1B is a block diagram of the fabric network environment of FIG. 1 after a host has moved.

FIG. 1B illustrates the fabric network environment of FIG. 1A with the first host 140A associated with the second edge node 130B. Accordingly, an encapsulated packed from the external host 141, transmitted by the second border node 120B to the first edge node 130A, will not reach its destination (e.g., the first host 140A) without further messaging as described below.

The fabric network 101 further includes a map-server map-resolver (MSMR) 150. In some embodiments, a map server implements mapping by accepting registration requests from tunnel routers (such as the edge nodes 130A-130C and/or border nodes 120A-120B in FIG. 1A), aggregating the registered endpoint identifier (EID) prefixes of endpoint devices (such as the hosts 140A-140E and/or 141) associated with the egress tunnel routers, and advertising the aggregated EID prefixes connecting to an appropriate topology (e.g., alternative logical topology (ALT) with border gateway protocol (BGP)). In some embodiments, the MSMR 150 connects to the ALT and accepts encapsulated map-request messages from tunnel routers (such as the edge nodes 130A-130C and/or 120A-120B in FIG. 1A for example), decapsulates the map-request messages, and forwards the map-request messages to the map server responsible for the tunnel router associated with the EID(s) requested in the map-request message.

Figure 2A:
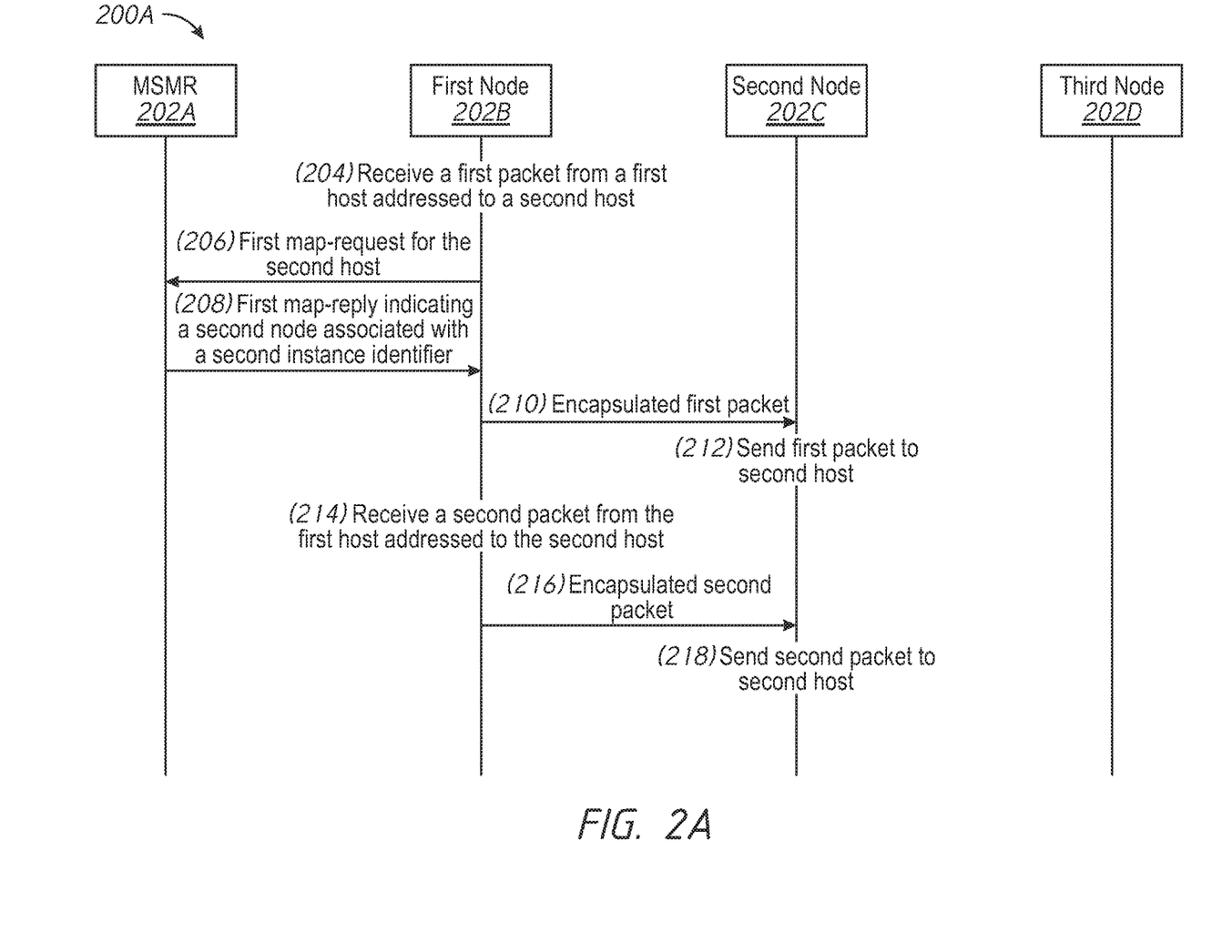
FIG. 2A is a signaling diagram of a first method of transmitting a packet in accordance with some embodiments.

FIG. 2A is a flow diagram of a first method 200A of sending and receiving a packet in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the method 200A is associated with a fabric network environment (e.g., the fabric network environment 100 in FIG. 1A). In some embodiments, the method 200A is performed at least in part by: a map-server map-resolver (MSMR) 202A (e.g., the MSMR 150 in FIG. 1), a first node 202B (e.g., the second border node 120B in FIG. 1A) associated with a first IID, a second node 202C (e.g., the first edge node 130A in FIG. 1A) associated with a second IID, and a third node 202D (e.g., the second edge node 130B is FIG. 1A) associated with the second IID.

In some embodiments, the first node 202B receives (204) a first packet from a first host (e.g., a source host) addressed to a second host (e.g., a destination host). For example, in various implementations, the second border node 120B in FIG. 1A receives a first packet from the external host 141 addressed to the first host 140A.

In some embodiments, the first node 202B sends (206) a first map-request for the second host to the MSMR 202A. Likewise, the MSMR 202A receives the first map-request for the second host from the first node 202B. In various implementations, the map-request includes the EID of the second host. In various implementations, the map-request includes the IID of the first node 202B. For example, in various implementations, the second border node 120B in FIG. 1A sends a map-request including the EID of the first host 140A and the IID of the second border node 120B (e.g., the first IID).

In some embodiments, the first node 202B receives (208) a first map-reply indicating a second node associated with the second instance identifier. In various implementations, the map-reply includes a routing location (RLOC) of the second host identified by the EID in the map-request. In particular, the RLOC indicates the node with which the second host is associated. In various implementations, the map-reply includes the second IID. For example, in various implementations, the second border node 120B in FIG. 1A receives a map-reply including an indication of the first edge node 130A (with which the host 140A is associated) and an indication of the second IID.

In various implementations, upon receiving the first map-reply, the first node 202B stores the received information in a map-cache. In various implementations, the first node 202B generates a map-cache entry for the second host that includes information regarding the second node 202C, e.g., the map-cache entry indicates that the second host is associated with the second node 202C. In various implementations, the first node 202B generates a map-cache entry for a particular instance identifier (e.g., the second instance identifier) of the second host that includes information regarding the second node 202C, e.g., the map-cache entry indicates that the second host is associated with the second node 202C. For example, in various implementations, the second border node 120B in FIG. 1A generates a map-cache entry for the first host 140A including an indication of the first edge node 130A (with which the first host 140A is associated).

In some embodiments, the first node 202B sends (210), to the second node 202C, the packet from the first host addressed to the second host to the second node 202C. In various implementations, the first node 202B encapsulates the packet with the second IID. For example, in various implementations, the second border node 120B in FIG. 1A encapsulates the packet with the second IID and routes the packet to the first edge node 130A.

In some embodiments, upon receiving the encapsulated packet, because the second host is associated with the second node 202C, the second node 202C decapsulates (212) the packet and forwards the packet to the second host. For example, in FIG. 1A, the first host 130A receives the packet from the second border node 120B, decapsulates the packet and forwards the packet to the first host 140A.

In some embodiments, the first node 202B receives (214) a second packet from the first host addressed to the second host. For example, in various implementations, the second border node 120B in FIG. 1A receives a second packet from the external host 141 addressed to the first host 140A.

In some embodiments, rather than sending a map-request for this second packet (as in step (206), the first node 202B consults a map-cache to determine which node to send the second packet to. As noted above, the first node 202B stores a map-cache entry for the second host that includes information regarding the second node 202C, e.g., the map-cache entry indicates that the second host is associated with the second node 202C. Accordingly, the first node 202B sends (216), to the second node 202C, the second packet from the first host addressed to the second host to the second node 202C. In various implementations, the first node 202B encapsulates the packet with the second IID. For example, in various implementations, the second border node 120B in FIG. 1A encapsulates the second packet with the second IID and routes the second packet to the first edge node 130A.

Figure 2B:
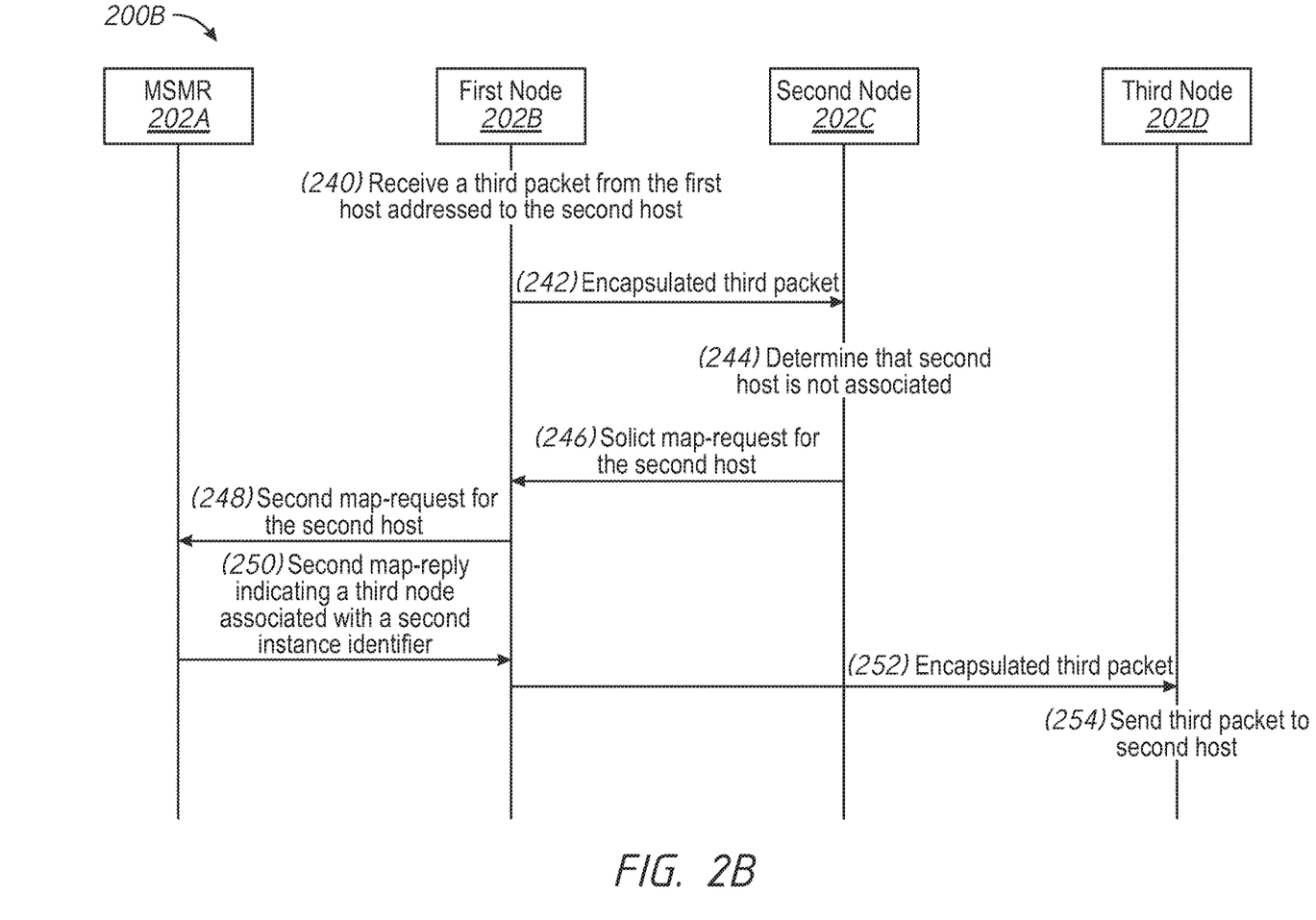
FIG. 2B is a signaling diagram of a second method of transmitting a packet in accordance with some embodiments.

FIG. 2B is a flow diagram of a second method 200A of sending and receiving a packet in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the method 200B is associated with a fabric network environment (e.g., the fabric network environment 100 in FIG. 1A). In some embodiments, the method 200B is performed at least in part by: a map-server map-resolver (MSMR) 202A (e.g., the MSMR 150 in FIG. 1B), a first node 202B (e.g., the second border node 120B in FIG. 1B) associated with a first IID, a second node 202C (e.g., the first edge node 130A in FIG. 1B) associated with a second IID, and a third node 202D (e.g., the second edge node 130B is FIG. 1B) associated with the second IID.

In some embodiments, the first node 202B receives (240) a third packet from a first host (e.g., a source host) addressed to a second host (e.g., a destination host). For example, in various implementations, the second border node 120B in FIG. 1B receives a third packet from the external host 141 addressed to the first host 140A.

In some embodiments, rather than sending a map-request for this third packet (as in step (206) of FIG. 2A), the first node 202B consults a map-cache to determine which node to send the third packet to. As noted above, the first node 202B stores a map-cache entry for the second host that includes information regarding the second node 202C, e.g., the map-cache entry indicates that the second host is associated with the second node 202C. Accordingly, the first node 202B sends (242), to the second node 202C, the third packet from the first host addressed to the second host to the second node 202C. In various implementations, the first node 202B encapsulates the packet with the second IID. For example, in various implementations, the second border node 120B in FIG. 1B encapsulates the second packet with the second IID and routes the second packet to the first edge node 130A.

In various implementations, upon receiving the encapsulated packet, when the second host is not associated with the second node 202 (e.g., the second host has moved within the fabric network), the second node 202C determines (244) that the second host is not associated with the second node 202C. For example, in FIG. 1B, the first host 140A has moved and associated with the second edge node 130B.

In some embodiments, the second node 202C sends (246) a solicit map-request for the second host to the first node 202B. Likewise, the first node 202B receives a solicit map-request for the second host from the second node 202C. In various implementations, the solicit map-request includes an instruction for the recipient of the solicit map-request to send a map-request. In various implementations, the solicit map-request includes the EID of the second host. In various implementations, the solicit map-request includes the EID of first host. In various implementations, the solicit map-request include the first IID and/or the second IID. For example, in FIG. 1B, the first edge node 130A sends a solicit map-request indicating the first host 140A (and the second IID) to the second border node 120B. Likewise, the second border node 120B receives a solicit map-request indicating the first host 140A and the second IID.

In some embodiments, in response to receiving the solicit map-request, the first node 202B sends (248) a second map-request for the second host to the MSMR 202A. Likewise, the MSMR 202A receives a second map-request for the second host from the first node 202B. For example, in FIG. 1B, upon receiving the solicit map-request, the second border node 120B sends a second map-request for the first host 140A to the MSMR 150.

In some embodiments, the first node 202B receives (250) a second-map reply from the MSMR 202A indicating a third node 202D associated with a second instance identifier. Likewise, the MSMR 202A sends, to the first node 202B, a second map-reply indicating a third node 202D. For example, in FIG. 1B, the second border node 120B receives, from the MSMR 150, a second map-reply for the first host 140A including an indication of the second edge node 130B (with which the host 140A is now associated) and an indication of the second IID.

In various implementations, upon receiving the second map-reply, the first node 202B updates a map-cache based on the received information. In various implementations, the first node 202B updates a map-cache entry for the second host that includes information regarding the third node 202D, e.g., the map-cache entry indicates that the second host is now associated with the third node 202D associated with the second instance identifier. For example, in various implementations, the second border node 120B in FIG. 1B generates a map-cache entry for the first host 140A including an indication of the second edge node 130B (with which the first host 140A is now associated).

In some embodiments, the first node 202B sends (252), to the third node 202D, the third packet from the first host addressed to the second host. In various implementations, the first node 202B encapsulates the third packet with the second IID. For example, in various implementations, the second border node 120B in FIG. 1B encapsulates the third packet with the second IID and routes the packet to the second edge node 130B.

In various implementations, upon receiving the encapsulated packet, the third node 202D decapsulates (254) the third packet and forwards the third packet to the second host. For example, in FIG. 1B, the second host 130B receives the third packet from the second border node 120B, decapsulates the third packet and forwards the third packet to the first host 140A.

Figure 3A:
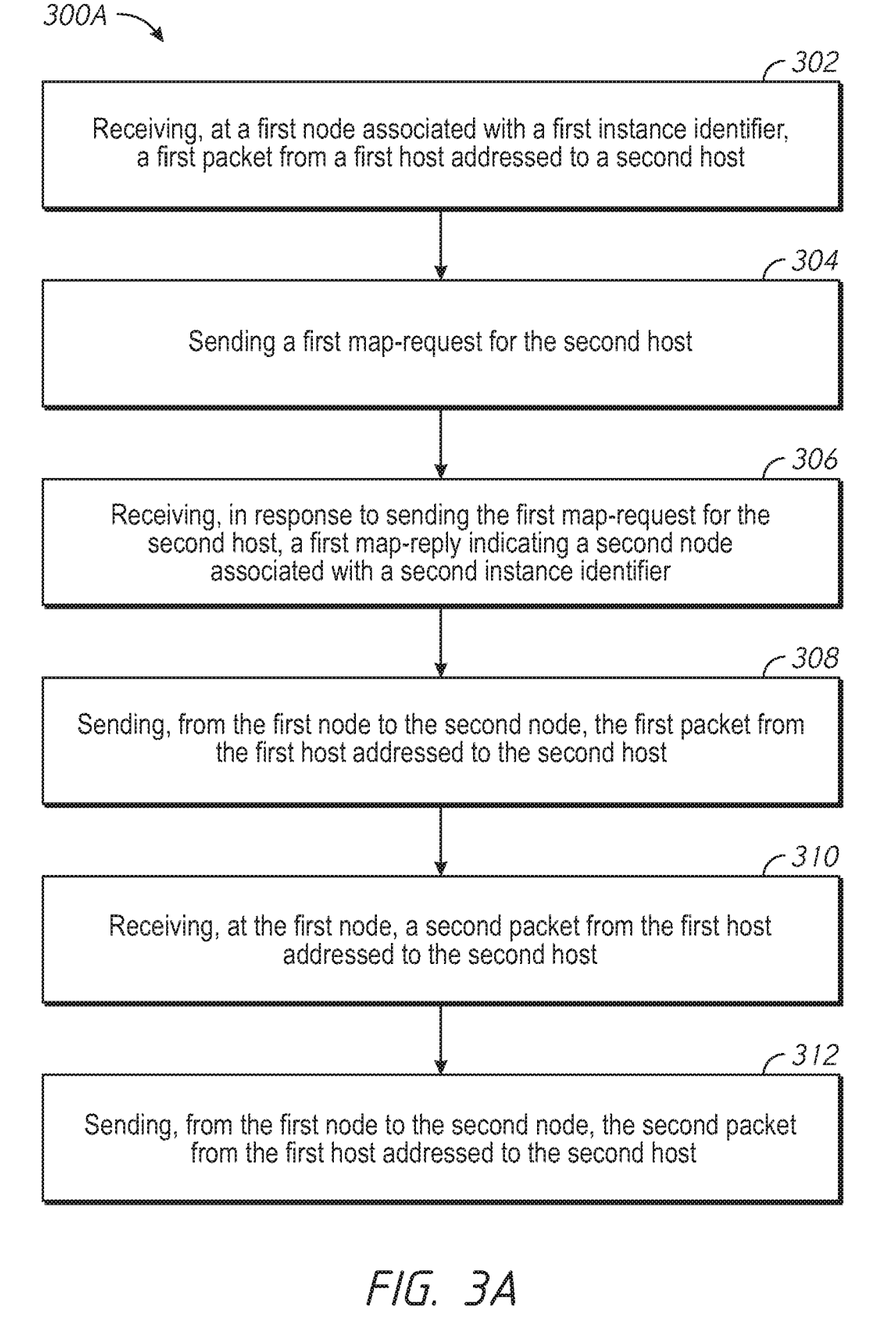
FIG. 3A is a flowchart representation of a first method of transmitting a packet in accordance with some embodiments.

FIG. 3A is a flowchart representation of a first method 300A of sending and receiving a packet in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the method 300A is associated with a fabric network environment (e.g., the fabric network environment 100 in FIG. 1A). To that end, as a non-limiting example, the method 300A occurs at a first node of a fabric network associated with a first instance identifier (e.g., the second border node 120B of FIG. 1A).

The method 300A begins, at block 302, with the first node (associated with a first instance identifier) receiving a first packet from a first host addressed to a second host (e.g., a packet from a source host addressed to a destination host). In some embodiments, the first packet from the first host addressed to the second host includes a source location of the first host (e.g., the EID of the first host), a destination location of the second host (e.g., the EID of the second host), and a second instance identifier.

The method 300A continues, at block 304, with the first node sending a first map-request for the second host. In some embodiments, the first map-request includes an indication of the second host (e.g., the EID of the second host) and the first instance identifier.

The method 300A continues, at block 306, with the first node receiving, in response to sending the first map-request for the second host, a first map-reply indicating a second node associated with a second instance identifier. In some embodiments, the second instance identifier is different than the first instance identifier. In some embodiments, in response to receiving the first map-request, the first node generates a map-cache entry for the second host that includes information regarding the second node, e.g., the map-cache entry indicates that the second host is associated with the second node.

The method 300A continues, at block 308, with the first node sending, from the first node to the second node, the first packet from the first host addressed to the second host. In some embodiments, the first node encapsulates the first packet from the first host addressed to the second host with the second instance identifier. Thus, in some embodiments, the first node sends the encapsulated first packet to the second node.

The method 300A continues, at block 310, with the first node receiving a second packet from the first host addressed to the second host. In some embodiments, the second packet from the first host addressed to the second host includes a source location of the first host (e.g., the EID of the first host), a destination location of the second host (e.g., the EID of the second host), and a second instance identifier.

In some embodiments, rather than sending a map-request for this second packet (as in block 304), the first node consults a map-cache to determine which node to send the second packet to. As noted above, in some embodiments, the first node stores a map-cache entry for the second host that includes information regarding the second node, e.g., the map-cache entry indicates that the second host is associated with the second node.

Accordingly, the method 300A continues, at block 312, with the first node sending, to the second node, the second packet from the first host addressed to the second host. In some embodiments, the first node encapsulates the second packet from the first host addressed to the second host with the second instance identifier. Thus, in some embodiments, the first node sends the encapsulated second packet to the second node.

Figure 3B:
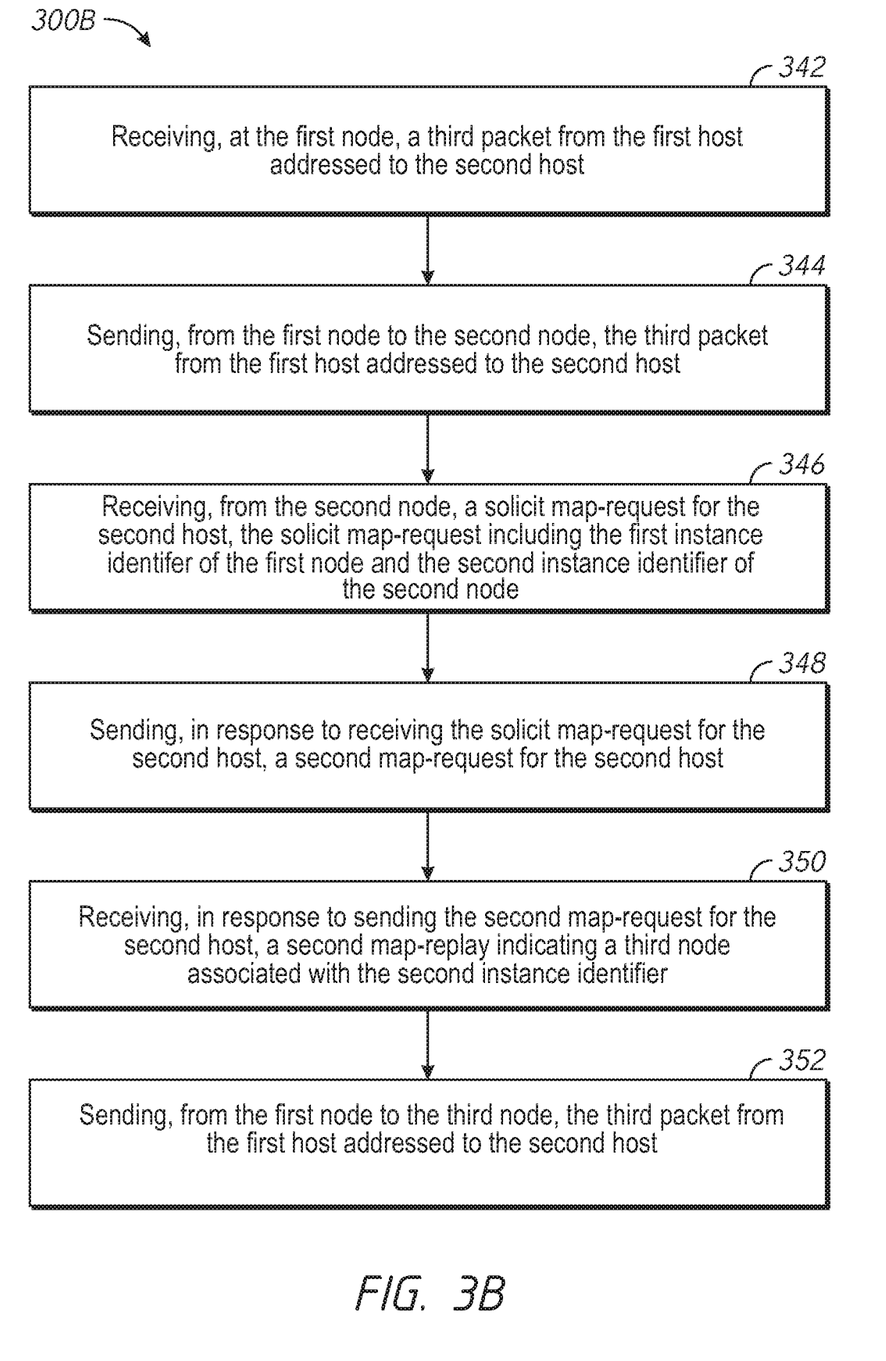
FIG. 3B is a flowchart representation of a second method of transmitting a packet in accordance with some embodiments.

FIG. 3B is a flowchart representation of a second method 300B of sending and receiving a packet in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the method 300B is associated with a fabric network environment (e.g., the fabric network environment 100 in FIG. 1B). To that end, as a non-limiting example, the method 300B occurs at a first node of a fabric network associated with a first instance identifier (e.g., the second border node 120B of FIG. 1B).

The method 300B begins, at block 342, with the first node receiving a third packet from the first host addressed to the second host. In some embodiments, the third packet from the first host addressed to the second host includes a source location of the first host (e.g., the EID of the first host), a destination location of the second host (e.g., the EID of the second host), and a second instance identifier.

In some embodiments, rather than sending a map-request for this third packet (as in block 304 of FIG. 3A), the first node consults a map-cache to determine which node to send the second packet to. As noted above, in some embodiments, the first node stores a map-cache entry for the second host that includes information regarding the second node, e.g., the map-cache entry indicates that the second host is associated with the second node.

Accordingly, the method 300B continues, at block 344, with the first node sending, to the second node, the second packet from the first host addressed to the second host. In some embodiments, the first node encapsulates the second packet from the first host addressed to the second host with the second instance identifier. Thus, in some embodiments, the first node sends the encapsulated second packet to the second node.

The method 300B continues, at block 346, with the first node receiving, from the second node, a solicit map-request for the second host, the solicit map-request including the second instance identifier of the second node. At this point, the second node has determined that the second host (e.g., the destination host) is not associated with the second node. Accordingly, the second node sends a solicit map-request to the first node. Accordingly, in various implementations, the solicit map-request is received in response to determining that the second host is not associated with the second node. The solicit map-request is a request that the recipient of the solicit map-request send a map-request. In some embodiments, the solicit map-request includes the first instance identifier of the first node so that the first node does not need to look up the first instance identifier to process the solicit-map request, speeding up the process.

In some embodiments, the solicit map-request has similar fields to a map-request, the difference being the setting of a flag in the message to indicate whether the message is a map-request or a solicit map-request. Accordingly, in various implementations, the solicit map-request includes an ED-Prefix field and a Source-ED field (which may be used during a map-request to indicate the destination host and source host, respectively). However, in some embodiments, in a solicit map-request, the ED-Prefix field is populated with the first instance identifier of the first node (rather than the EID of the destination host as in a map-request). In some embodiments, in a solicit map-request, the Source-ED field is populated with the second instance identifier of the second node (rather than the EID of the source host as in a map-request).

Thus, in various implementations, as noted above, the solicit map-request includes the first instance identifier of the first node. In various implementations, the first instance identifier of the first node is included in an EID-Prefix field of the solicit map-request. In various implementations, the second instance identifier of the second node is included in a Source-EID field of the solicit map-request.

In some embodiments, in response to receiving the solicit map-request for the second host, the method 300B includes updating a map-cache stored by the first node. In particular, the method 300B includes updating a map-cache entry (stored by the first node) of the second host to include information regarding the third node (rather than information regarding the second node). In particular, in various implementations, the method 300B includes updating a map-cache entry (stored by the first node) of a particular instance identifier (e.g., the second instance identifier) of the second host to include information regarding the third node (rather than information regarding the second node).

Because the solicit map-request for the second host includes the second instance identifier, the first node can update other map-cache entries (stored by the first node) of other instance identifiers of the second host. Thus, in some embodiments, in response to receiving the solicit map-request for the second host (which includes the second instance identifier), the method 300B includes sending one or more additional map-requests for other instance identifiers of the second host to update additional map-cache entries (stored by the first node) of the second host.

The method 300B continues, in block 348, with the first node sending, in response to receiving the solicit map-request for the second host, a second map-request for the second host. In some embodiments, the second map-request for the second host includes the first instance identifier of the first node received in the solicit map-request. Accordingly, the first node need not look up the first instance identifier to process the solicit map-request. In various implementations, the first node is associated with multiple instance identifiers and the first node need not select which of the multiple instance identifiers are needed to process the solicit map-request.

The method 300 continues, in block 350, with the first node receiving, in response to sending the second map-request for the second host, a second map-reply indicating a third node associated with the second instance identifier.

The method 300 continues, in block 352, with the first node sending, from the first node to the third node, the third packet from the first host addressed to the second host or a subsequently received packet from the first host addressed to the second host. In various implementations, the first node encapsulates the third packet with the second instance identifier prior to sending the third packet to the third node.

Figure 4:
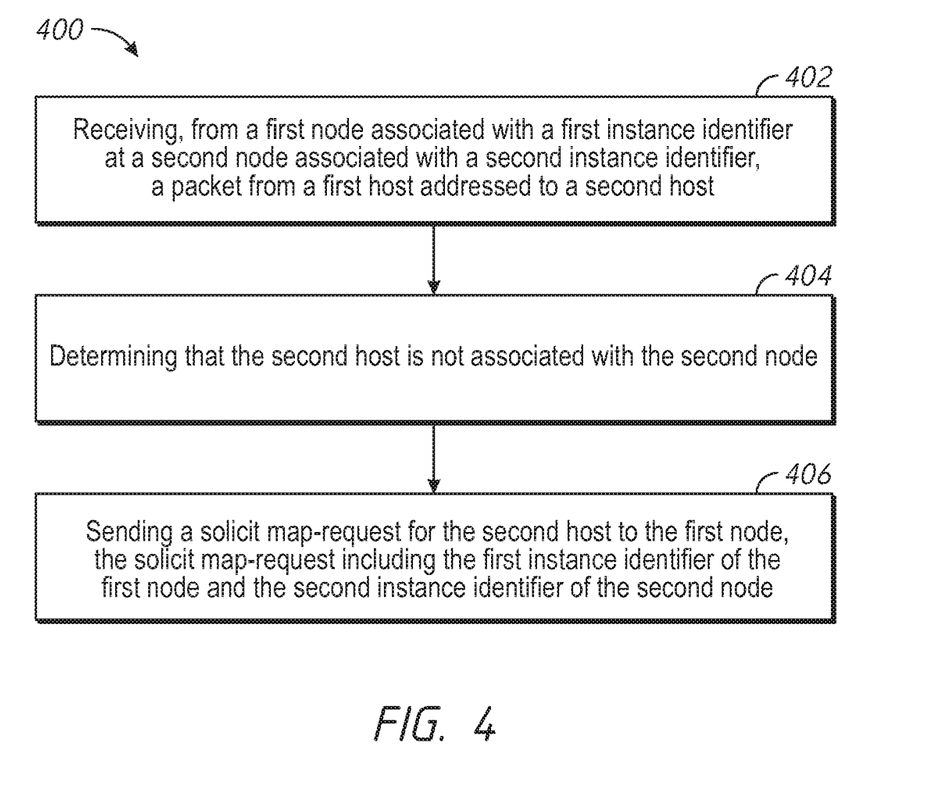
FIG. 4 is a flowchart representation of a method of sending a solicit map-request in accordance with some embodiments.

FIG. 4 is a flowchart representation of a method 400 of sending a solicit map-request from a second node in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the method 400 is associated with a fabric network environment (e.g., the fabric network environment 100 in FIG. 1B). To that end, as a non-limiting example, the method 400 occurs at a second node of a fabric network associated with a second instance identifier (e.g., the first edge node 130A of FIG. 1B). The method 400 includes: receiving, from a first node associated with a first instance identifier at a second node associated with a second instance identifier, a packet from a first host addressed to a second host; determining that the second host is not associated with the second node; and sending a solicit map-request for the second host to the first node, the solicit map-request including the second instance identifier of the second node.

The method 400 begins, at block 402, with the second node receiving, from a first node associated with a first instance identifier, a packet from a first host addressed to a second host.

The method 400 continues, at block 404, with the second node determining that the second host is not associated with the second node. In various implementations, the second host was previously associated with the second node, but has moved and associated with a third node.

The method 400 continues, at block 406, with the second node sending a solicit map-request for the second host to the first node, the solicit map-request including the second instance identifier of the second node. In various implementations, the solicit map-request for the second host to the first node includes the first instance identifier of the first node. For example, in some embodiments, the first instance identifier of the first node is included in an ED-Prefix field of the solicit map-request. In some embodiments, the second instance identifier of the first node is included in a Source-EID field of the solicit map-request.

In various implementations, in order to send the solicit map-request to the first node, the second node must determine the node from which the packet was received. For example, in various implementations, the packet includes an indication of the first host (from which was the packet is sourced) and an indication of the second host (for which the packet is destined, but is also not associated with the second host). Accordingly, the second node sends a map-request for the first host ensuring that the solicit map-request will reach the node associated with the first host (e.g., the first node having an outdated map-cache). Thus, in various implementations, sending the solicit map-request for the second host to the first node includes sending, to a map-server, a map-request for the first host and receiving, in response to sending the map-request for the first host, a map-reply indicating the first node associated with the first instance identifier. In various implementations, the first instance identifier is determined by the second node based on a map-cache entry of the first host stored by the second node.

Figure 5:
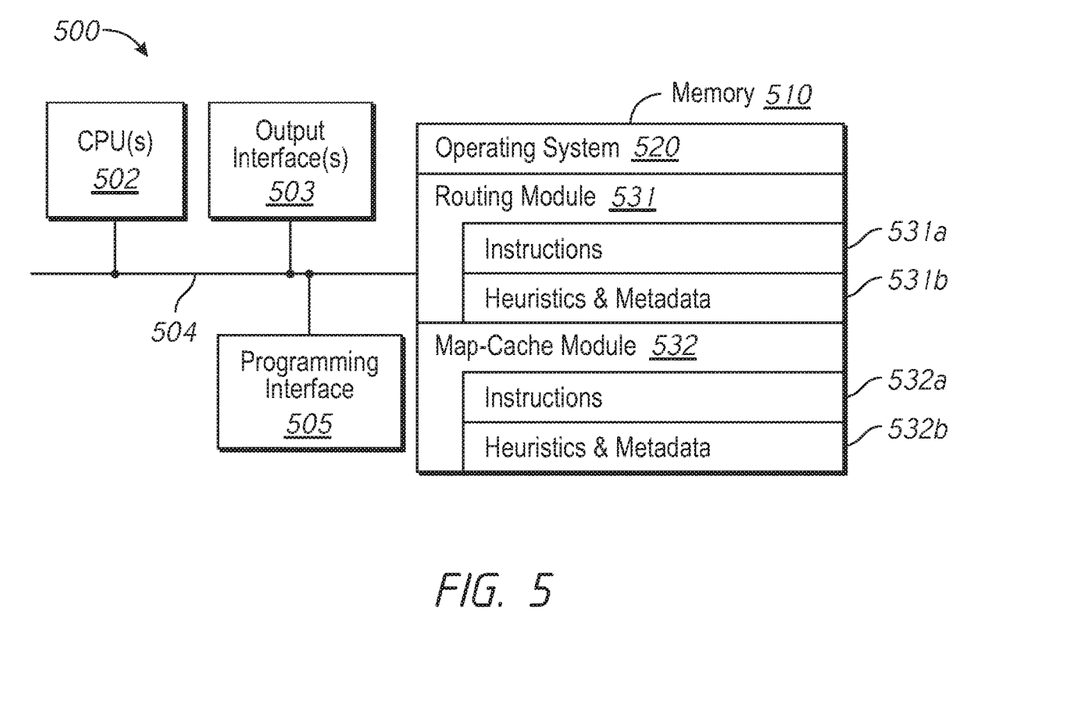
FIG. 5 is a block diagram of an example device in accordance with some embodiments.

FIG. 5 is a block diagram of an example device 500 in accordance with some embodiments. In some embodiments, the device corresponds to one of the edge nodes 130A-130C, the border nodes 120A-120B, or one of the hosts 140A-140E (or portions thereof) of FIG. 1A-1B and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the device 500 includes one or more processing units (CPU(s)) 502 (e.g., processors), one or more output interfaces 503 (e.g., a network interface), a memory 510, a programming interface 505, and one or more communication buses 504 for interconnecting these and various other components.

In some embodiments, the communication buses 504 include circuitry that interconnects and controls communications between system components. The memory 510 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 510 optionally includes one or more storage devices remotely located from the CPU(s) 502. The memory 510 comprises a non-transitory computer readable storage medium. Moreover, in some embodiments, the memory 510 or the non-transitory computer readable storage medium of the memory 510 stores the following programs, modules and data structures, or a subset thereof including an optional operating system 520, an routing module 531 and a map-cache module 532. In some embodiments, one or more instructions are included in a combination of logic and non-transitory memory. The operating system 520 includes procedures for handling various basic system services and for performing hardware dependent tasks.

In some embodiments, the routing module 531 is configured to receive a packet from a first host addressed to a second host and route the packet to the second host. To that end, the routing module 531 includes a set of instructions 531a and heuristics and metadata 531b. In various implementations, the routing module 531 is configured to receive, from the second node, a solicit map-request for the second host, the solicit map-request including the first instance identifier of the first node and the second instance identifier of the second node; send, in response to receiving the solicit map-request for the second host, a map-request for the second host; receive, in response to sending the map-request for the second host, a map-reply indicating a third node associated with the second instance identifier; and send, from the first node to the third node, the packet from the first host addressed to the second host.

In some embodiments, the map-cache module 532 is configured to update a map-cache. To that end, the map-cache module 532 includes a set of instructions 532a and heuristics and metadata 532b. In various implementations, the map-cache module 532 is configured to update a map-cache entry of the second host to include information regarding the third node rather than information regarding the second node. In various implementations, the map-cache module 532 is configured to update map-cache entries of other hosts based on routing module 531 sending one or more additional map-requests for other hosts associated with the second instance identifier.

Although the routing module 531 and the map-cache module 532 are illustrated as residing on a single device 500, it should be understood that in other embodiments, any combination of the routing module 531 and the map-cache module 532 can reside in separate devices. For example, in some embodiments, each of the routing module 531 and the map-cache module 532 reside in a separate device.

Moreover, FIG. 5 is intended more as functional description of the various features which be present in a particular embodiment as opposed to a structural schematic of the embodiments described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in some embodiments. The actual number of modules and the division of particular functions and how features are allocated among them will vary from one embodiment to another and, in some embodiments, depends in part on the particular combination of hardware, software, and/or firmware chosen for a particular embodiment.

Figure 6:
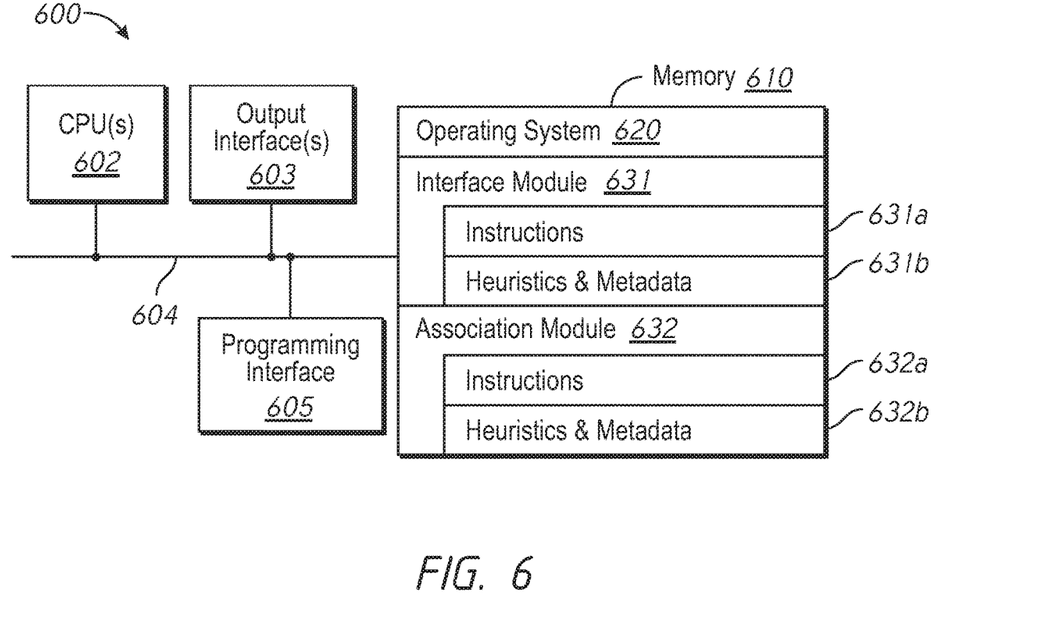
FIG. 6 is a block diagram of another example device in accordance with some embodiments.

FIG. 6 is a block diagram of an example device 600 in accordance with some embodiments. In some embodiments, the device corresponds to one of the edge nodes 130A-130C, the border nodes 120A-120B, or one of the hosts 140A-140E (or portions thereof) of FIG. 1A-1B and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the device 600 includes one or more processing units (CPU(s)) 602 (e.g., processors), one or more output interfaces 603 (e.g., a network interface), a memory 610, a programming interface 605, and one or more communication buses 604 for interconnecting these and various other components.

In some embodiments, the communication buses 604 include circuitry that interconnects and controls communications between system components. The memory 610 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 610 optionally includes one or more storage devices remotely located from the CPU(s) 602. The memory 610 comprises a non-transitory computer readable storage medium. Moreover, in some embodiments, the memory 610 or the non-transitory computer readable storage medium of the memory 610 stores the following programs, modules and data structures, or a subset thereof including an optional operating system 620, an interface module 631 and an association module 632. In some embodiments, one or more instructions are included in a combination of logic and non-transitory memory. The operating system 620 includes procedures for handling various basic system services and for performing hardware dependent tasks.

In some embodiments, the interface module 631 is configured to receive, from a first node associated with the first instance identifier at a second node associated with a second instance identifier, a packet from a first host addressed to a second host. To that end, the interface module 631 includes a set of instructions 631a and heuristics and metadata 631b.

In some embodiments, the association module 632 is configured to determine that the second host is not associated with the second node. To that end, the association module 632 includes a set of instructions 632a and heuristics and metadata 632b. In various implementations, the interface module 631 is further configured to send a solicit map-request for the second host to the first node, the solicit map-request including the first instance identifier of the first node and the second instance identifier of the second node.

Although the interface module 631 and the association module 632 are illustrated as residing on a single device 600, it should be understood that in other embodiments, any combination of the interface module 631 and the association module 632 can reside in separate devices. For example, in some embodiments, each of the interface module 631 and the association module 632 reside in a separate device.

Moreover, FIG. 6 is intended more as functional description of the various features which be present in a particular embodiment as opposed to a structural schematic of the embodiments described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in some embodiments. The actual number of modules and the division of particular functions and how features are allocated among them will vary from one embodiment to another and, in some embodiments, depends in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
receiving, at a first node associated with a first instance identifier, a packet from a first host addressed to a second host;
sending, from the first node to a second node associated with a second instance identifier, the packet from the first host addressed to the second host, wherein sending, from the first node to the second node, the packet from the first host addressed to the second host comprises identifying the second node based on a map-cache entry of the second host stored by the first node;
receiving, from the second node, a solicit map-request for the second host, the solicit map-request including the first instance identifier of the first node and the second instance identifier of the second node;
sending, in response to receiving the solicit map-request for the second host, a map-request for the second host;
receiving, in response to sending the map-request for the second host, a map-reply indicating a third node associated with the second instance identifier;
sending, from the first node to the third node, the packet from the first host addressed to the second host;
updating the map-cache entry of the second host stored by the first node to include information regarding the third node rather than information regarding the second node; and
sending one or more additional map-requests for other instance identifiers of the second host to update additional map-cache entries of the second host stored by the first node.

2. The method of claim 1, further comprising encapsulating the packet with the second instance identifier prior to sending the packet from the first node to the second node.

3. The method of claim 1, wherein the first instance identifier of the first node is included in an Endpoint Identifier (EID)-Prefix field of the solicit map-request.

4. The method of claim 1, wherein the second instance identifier of the second node is included in a Source-Endpoint Identifier (EID) field of the solicit map-request.

5. The method of claim 1, wherein the map-request for the second host includes the first instance identifier of the first node received in the solicit map-request.

6. The method of claim 1, wherein the solicit map-request is received in response to determining that the second host is not associated with the second node.

7. The method of claim 1, wherein the second instance identifier is different than the first instance identifier.

8. A first node associated with a first instance identifier, the first node comprising:
a network interface; and
one or more processors configured to:
receive, via the network interface, a packet from a first host addressed to a second host;
send, via the network interface to a second node associated with a second instance identifier, the packet from the first host addressed to the second host, wherein the one or more processors being configured to send the packet from the first host addressed to the second host comprises the one or more processors being operative to identify the second node based on a map-cache entry of the second host stored by the first node;
receive, via the network interface from the second node, a solicit map-request for the second host, the solicit map-request including the first instance identifier of the first node and second instance identifier of the second node;
send, via the network interface in response to receiving the solicit map-request for the second host, a map-request for the second host;
receive, via the network interface in response to sending the map-request for the second host, a map-reply indicating a third node associated with the second instance identifier;
send, via the network interface to the third node, the packet from the first host addressed to the second host;
update the map-cache entry of the second host stored by the first node to include information regarding the third node rather than information regarding the second node; and
send one or more additional map-requests for other hosts associated with the second instance identifier to update additional map-cache entries of the other hosts stored by the first node.

9. The first node of claim 8, wherein the first instance identifier of the first node is included in an Endpoint Identifier (EID)-Prefix field of the solicit map-request and the second instance identifier of the second node is included in a Source-Endpoint Identifier (EID) field of the solicit map-request.

10. A non-transitory computer readable storage medium that stores a set of instructions which when executed by a processor perform a method comprising:
receiving, at a first node associated with a first instance identifier, a packet from a first host addressed to a second host;
sending, from the first node to a second node associated with a second instance identifier, the packet from the first host addressed to the second host, wherein sending, from the first node to the second node, the packet from the first host addressed to the second host includes identifying the second node based on a map-cache entry of the second host stored by the first node;
receiving, from the second node, a solicit map-request for the second host, the solicit map-request including the first instance identifier of the first node and the second instance identifier of the second node;
sending, in response to receiving the solicit map-request for the second host, a map-request for the second host;
receiving, in response to sending the map-request for the second host, a map-reply indicating a third node associated with the second instance identifier;
sending, from the first node to the third node, the packet from the first host addressed to the second host;
updating the map-cache entry of the second host stored by the first node to include information regarding the third node rather than information regarding the second node; and
sending one or more additional map-requests for other instance identifiers of the second host to update additional map-cache entries of the second host stored by the first node.

11. The non-transitory computer readable storage medium of claim 10, further comprising encapsulating the packet with the second instance identifier prior to sending the packet from the first node to the second node.

12. The non-transitory computer readable storage medium of claim 10, wherein the first instance identifier of the first node is included in an Endpoint Identifier (EID)-Prefix field of the solicit map-request.

13. The non-transitory computer readable storage medium of claim 10, wherein the second instance identifier of the second node is included in a Source-Endpoint Identifier (EID) field of the solicit map-request.

14. The non-transitory computer readable storage medium of claim 10, wherein the map-request for the second host includes the first instance identifier of the first node received in the solicit map-request.

15. The non-transitory computer readable storage medium of claim 10, wherein the solicit map-request is received in response to determining that the second host is not associated with the second node.

16. The non-transitory computer readable storage medium of claim 10, wherein the second instance identifier is different than the first instance identifier.

* * * * *